April 26, 1966     T. D. LODE     3,247,676
AERODYNAMIC COOLING
Filed Jan. 14, 1965

INVENTOR
TENNY D. LODE 3,247,676
AERODYNAMIC COOLING
Tenny D. Lode, Madison, Wis., assignor to Rosemount
 Engineering Company, Minneapolis, Minn., a corporation of Minnesota
Filed Jan. 14, 1965, Ser. No. 425,583
7 Claims. (Cl. 62—86)

This invention relates to a method and means for the cooling of air and other compressible fluids. Applications include cooling for high speed aircraft and the cooling of air or gas for various uses.

It is well known that the measured total temperature of air entering a forward facing inlet on a high speed aircraft will be higher than the static air temperature measured by a stationary observer. A common expression for the total temperature of air is $$T = T_0(1 + 0.2M^2)$$

where T is the total temperature, $T_0$ the static temperature, 0.2 a constant derived from the specific heats of air at constant volume and constant pressure, and M the Mach number. The temperatures are with respect to the Kelvin (absolute centigrade) or Rankine (absolute Fahrenheit) temperature scales. As an example, at Mach 0.5 and an ordinary low altitude temperature of 300° Kelvin (approximately 80° F.)

$$T = 300(1 + .05) = 315° K.$$

Thus the temperature rise under these conditions will be 15° C. or 27° F.

At higher speeds the magnitude of compressional heating is much greater. The magnitude of friction heating in the boundary layer is similar to the magnitude of compression heating so that the entire airplane will be at a temperature nearly equal to the total temperature. Hence it is generally necessary to provide some form of cooling to avoid roasting the crew and/or equipment.

One view of the total temperature is that the difference between the total and static temperatures represents the energy which is added to the gas in the process of compressing it. A molecular view is that the average total energy of the gas molecules as seen by the high speed aircraft is a root mean square sum of their random thermal motions (representing the static temperature) and the relative motion of the air mass. As aircraft operate at higher speeds, cooling problems become more severe. As is well known, compressional and frictional heating at speeds of Mach 3 are sufficient to soften conventional aluminum alloys and severely restrict their use on such high speed aircraft.

An object of this invention is to provide a method and means for obtaining relatively cool air on board a high speed aircraft in flight. A further object is to provide a method and means which will be generally useful for the cooling of compressible fluids.

In a particular form of the invention, an air inlet is mounted on a high speed aircraft. The inlet faces generally to the rear and extends beyond the region of the aircraft surface boundary layer. As will be explained subsequently, air drawn through this rear facing inlet will be cooler than the air which would be collected by a forwardly facing inlet. Hence, cooling air may be drawn in through such a rear facing inlet, passed through a thermal load and subsequently dumped overboard.

Figure 1:
FIGURE 1 is a simplified mechanical schematic illustration of a first form of the invention arranged for aircraft cooling.

Referring now to the drawings, FIGURE 1 includes airfoil-shaped object 11 with rear air inlet 12. Object 11 is assumed to be moving through the air such that the relative wind is as indicated by relative wind vector 13.

As mentioned previously, a small cell of air which is collected by a forward facing air inlet on a moving vehicle will be heated by compression to the total temperature. Now let us consider what happens to a small cell of air which is initially at rest but which is eventually sucked into moving, rear facing air inlet 12. It is assumed that pumping means not shown in FIGURE 1 are operating to draw air in through inlet 12. As airfoil-shaped object 11 passes, the air cell will first be pushed out of the way, then pulled along behind object 11 by the low pressure region at the rear and finally sucked into air inlet 12. In the case of a forward facing air scoop, the energy needed to accelerate the air to the vehicle velocity is provided by the forward facing inlet. The energy lost by the inlet appears as a form of drag, and the energy transferred to the collected air appears as compressional heating of that air. In the case of rear facing suction inlet 12, part of the energy necessary to accelerate the air into a low pressure region, so that it moves toward the moving air inlet 12, will come from expansion and cooling of the air itself. Thus, air which is drawn into rear facing inlet 12 will have used up part of its internal energy in catching up to object 11 and inlet 12. The measured static temperature of air passing into inlet 12 will be lower than the total temperature of air impinging on the front of object 11 and may be lower than the static temperature.

A question to be considered at this point is why the total temperature is not preserved for a rear facing inlet. The preservation of total temperature, like so many other quantities, depends on the coordinate system or frame of reference of the observer. For a forward facing inlet on a moving vehicle, total temperature is preserved for an observer moving with the vehicle but not for a stationary observer. As far as the moving observer is concerned, the total energy of the air remains the same. The process of collecting air is simply a transformation of the apparent kinetic energy of the air into compression and heating. To a stationary observer, the moving air inlet adds energy to the air so that the total energy of the collected air is increased. For a rear facing inlet, the total temperature is preserved for a stationary observer but not for a moving observer. To a stationary observer, an air cell which is sucked into the rear facing inlet is first accelerated toward the inlet by its own expansion as it moves toward the low pressure area. The total energy of the air remains the same. The acceleration represents a transformation of a portion of the internal energy of the air into kinetic energy of motion. To an observer on the moving object, the air which has been accelerated in the direction of the rear facing inlet will have little kinetic energy, and he will see only its reduced internal energy or static temperature.

A second question to consider is why all high speed aircraft do not have cold tails. The previous description and explanation has neglected boundary layer friction and turbulent heating or mixing. The term boundary layer refers to the layer of air which has been significantly affected by frictional contact with the surface of the aircraft. Frictional heating will cause the boundary layer air flowing over the aircraft surface to be at nearly the total temperature. A moving airfoil without rear facing air inlets will reach a thermal equilibrium with the boundary layer and will be heated over its entire surface. This implies that if cool air is to be obtained by the process described above, the rear facing inlet must suck in a sufficient quantity of air so that it sucks in more than the boundary layer. For greater efficiency it may be desirable to use various boundary layer control techniques to reduce the thickness of the boundary layer passing around the rear facing inlet.

Figure 2:
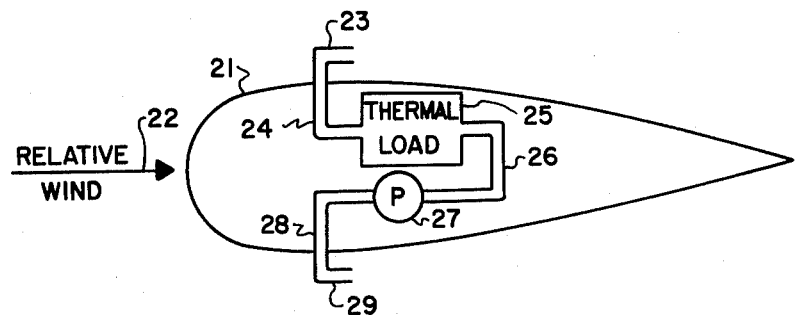
FIGURE 2 is a mechanical schematic illustration of a second form of the invention arranged for aircraft cooling and showing certain additional details which were omitted from FIGURE 1.

Reference is now made to FIGURE 2 which is a mechanical schematic illustration of a second form of the invention showing certain additional details which were omitted from FIGURE 1. In FIGURE 2, airfoil-shaped structure 21 is assumed to be moving through the air such that the relative wind will be as indicated by relative wind vector 22. Rear facing air inlet 23 connects via duct 24 to a first side of thermal load 25. The second side of thermal load 25 connects via duct 26 to a first side of pump 27. The second side of pump 27 connects via duct 28 to rear facing air exhaust 29.

FIGURE 2 illustrates an aircraft cooling system employing the principle illustrated by FIGURE 1 and previously described. Structure 21 may be the fuselage of an aircraft, a portion thereof, a portion of a wing or other structure, or a separate aerodynamic structure. Rear facing air inlet 23 is placed on a curved portion of airfoil structure 21 where the local static pressure and temperature will be lower than the free air values, or in other words, the values of static pressure and temperature of air which has not been significantly disturbed by the passage of object 11. Air enters through inlet 23, passes through thermal load 25, and is pumped out by pump 27 through exhaust 29. The use of similarly shaped and positioned inlets and outlets allows the cooling air to be brought in and expelled at essentially the same pressure and without a significant pumping effort. If desired, inlet 23 may be placed at a region of higher pressure than that of outlet 29 so that cooling air would be sucked in without mechanial pumping.

Figure 3:
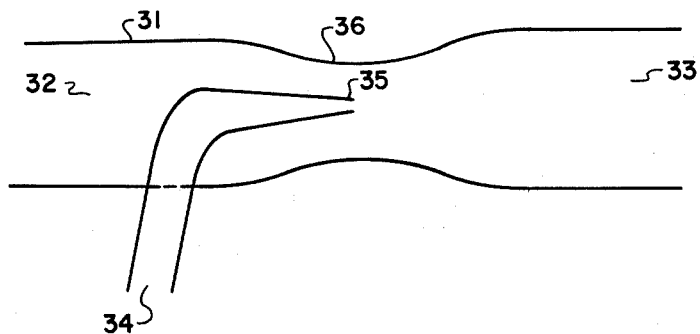
FIGURE 3 is a mechanical schematic illustration of a third form of the invention arranged for stationary cooling of compressible fluids.

Reference is now made to FIGURE 3 which is a mechanical schematic illustration of a third form of the invention arranged for the stationary cooling of air or other compressible fluids. In FIGURE 3, venturi tube 31 includes compressed air inlet 32 and air outlet 33. Suction line 34 extends into the interior of venturi tube 31 and terminates at nozzle 36 in venturi throat 35.

FIGURE 3 illustrates a venturi tube which is sometimes used as a suction pump. Compressed air flows in through inlet 32 and out through outlet 33. In normal venturi operation, a partial vacuum is formed at throat 36 so that suction line 34 may be used as a source of reduced pressure. If an external suction pump is connected to line 34 so that air is drawn in through nozzle 35 and out through line 34, this air will be cooled in the manner described previously. It may be noted that this is the reverse of the normal use of a venturi device in that air is pumped out of the suction inlet rather than being allowed to flow into the suction line. An alternate method of operation of the structure of FIGURE 3 would be to partially restrict air outlet 33, thereby raising its internal pressure. Expanded and relatively cooled air will then flow out through line 34 without external pumping.

The operation of the structure of FIGURE 3 has been described for air. Similar results would be achieved with other compressible fluids. In some instances it may be desirable to interchange the connections to and functions of compressed air inlet 32 and suction line 34.

What is claimed is:

1. Means for obtaining a stream of relatively cool air on board an aircraft in flight including an air inlet on the exterior of said aircraft with an opening facing generally in the direction of relative air flow, and means for drawing air in through said inlet opening.

2. The combination as specified in claim 1 in which said inlet opening is positioned away from the aircraft structure so as to reduce the intake of aircraft boundary layer air.

3. A method of obtaining a stream of relatively cool compressible fluid from the fluid surrounding an object having relative motion with respect to the fluid including providing an inlet on the object with an opening facing generally in the direction of relative fluid flow, and drawing fluid in through said inlet opening.

4. The method of claim 3 including the further step of passing said fluid in heat transfer relationship to a thermal load, and exhausting said fluid from said object.

5. Means for obtaining a stream of relatively cool compressible fluid from fluid surrounding an object having relative motion thereto, including a fluid inlet on the object with an opening therein facing generally in the direction of relative movement of the fluid, and means for drawing fluid in through said inlet opening.

6. The combination as specified in claim 5 wherein said means for drawing said fluid in through said inlet opening is comprised as a device for creating a negative pressure at said inlet opening.

7. The combination as specified in claim 6 further characterized in that there is a thermal load on the object, means for directing said relatively cool compressible fluid in heat transfer relationship to said thermal load, and means for exhausting said compressible fluid from said object.

References Cited by the Examiner

UNITED STATES PATENTS 2,386,560  10/1945  Lunt _____ 62—401
2,441,279  5/1948   McCollum _____ 62—401

FOREIGN PATENTS 482,104  4/1952  Canada.
885,899  6/1943  France.

WILLIAM J. WYE, *Primary Examiner.*